Figure 1:
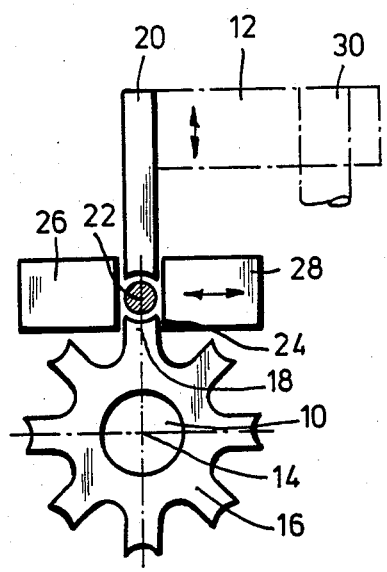

United States Patent [19]

Knapp

[11] Patent Number: 4,596,352
[45] Date of Patent: Jun. 24, 1986

[54] APPARATUS FOR JOINING OR, RESPECTIVELY COMPRESSING ELECTRIC CONDUCTORS

[75] Inventor: Herbert Knapp, Reinheim, Fed. Rep. of Germany

[73] Assignee: Schunk Ultraschalltechnik GmbH, Aschaffenburg, Fed. Rep. of Germany

[21] Appl. No.: 654,171

[22] Filed: Sep. 25, 1984

[30] Foreign Application Priority Data

Sep. 29, 1983 [DE] Fed. Rep. of Germany ....... 3335254

[51] Int. Cl.$^4$ ............................................. B23K 20/10
[52] U.S. Cl. ...................... 228/1.1; 29/873; 156/580.1
[58] Field of Search .......... 228/1.1, 3.1, 265; 156/580.1, 580.2; 29/872-873, 882

[56] References Cited

U.S. PATENT DOCUMENTS

| | | | |
|---|---|---|---|
| 2,002,220 | 5/1935 | Douglas | 29/882 |
| 3,426,951 | 2/1969 | Pohlman et al. | 228/1.1 |
| 3,717,842 | 2/1973 | Douglas, Jr. | 228/1.1 X |
| 3,848,792 | 11/1974 | Mims | 228/1.1 |
| 4,032,382 | 6/1977 | Obeda | 228/110 X |

FOREIGN PATENT DOCUMENTS 3151151 6/1983 Fed. Rep. of Germany ....... 228/1.1

*Primary Examiner*—Kenneth J. Ramsey
*Attorney, Agent, or Firm*—Cushman, Darby & Cushman

[57] ABSTRACT

In order to compress electric conductors (22) like strands by means of ultrasonics and/or weld them together in a joining knot it is suggested that the sonotrode (10) of an ultrasonic welding device has a surface (18) preferably positioned centrally above or below the longitudinal axis of the sonotrode (14), which surface being coordinated with a surface (20) of an anvil (12) for the upper and lower bounding of a compression chamber (24) for the lodging of the conductors (22). The compression chamber (24) is laterally limited by cheeks of which at least one is movably designed.

8 Claims, 8 Drawing Figures

APPARATUS FOR JOINING OR, RESPECTIVELY COMPRESSING ELECTRIC CONDUCTORS

The invention relates to an apparatus for joining or, respectively compressing electric conductors, preferably strands or the like, comprising a sonotrode generating sound vibrations with a coordinated counter electrode serving as anvil, as well as a compression chamber provided between sections of the sonotrode and the anvil for lodging the conductors, where the sonotrode and the anvil are movable relative to each other.

A corresponding stationarily designed apparatus is described in the German Application No. 31 51 151. By means of this system operating with ultrasonics, it has been possible for the first time to join electric conductors, like e.g. strands, in such a manner that one could do without the since customary sleeves surrounding the knot point, where at the same time a high strength of the joint is obtained. Thereby the strands are joined together so closely that the transition resistances are not influenced by oxidation. In the apparatus as described in the No. DE-A-31 51 151 the compression chambers are positioned not in center relative to the longitudinal axis of the sonotrode and in the marginal area. In view of this fact during the welding operation lateral forces will have an effect on the sonotrode, which makes it necessary to position the sonotrode in such a manner that it will withstand these forces.

It is the object of the present invention to design an apparatus of the above mentioned kind in such a manner that by a simple construction and easy handling it is guaranteed that a compression chamber is formed between the sonotrode and the anvil accepting the conductors to the required extent, where an unproblematic adaptation to different conductor dimensions shall take place. Thereby the compression chamber shall guarantee that the conductors to be joined or, resp. compressed or sealed cannot slip out of the compression chamber during the sound effect in an uncontrolled manner.

According to the invention this object is realized in such a manner that limiting areas of the compression chamber facing each other are defined each time by at least of one surface of the sonotrode and the anvil and the remaining limiting areas of limiting elements, of which at least one is movably designed. In an embodiment the sonotrode has at least one projection or a recess, coordinated with either of them is a projection of the anvil, where the surfaces of the projection or the recess of the sonotrode facing each other and of the projection of the anvil are defining the upper and lower limiting walls or, respectively surfaces of the compression chamber, which preferably is being arranged centrally above or below the longitudinal axis of the sonotrode.

By the embodiment of the apparatus according to the invention it is guaranteed that during the joining or, respectively, compressing operation a compression chamber is made available fully lodging the conductors, where an adaption to different conductor dimensions is possible. Further no transverse forces have an essential effect on the sonotrode during the joining or, respectively sealing of the electric conductor, which forces according to prior art can only be compensated by check bearings or any equivalent special fixation of the sonotrode. By the preferably centric alignment relative to the longitudinal axis of the sonotrode an uncomplicated construction of the compression chamber is possible, where the lateral limitation of same is effected by the limitation elements, preferably designed like cheeks. In this embodiment at least one of the limitation elements is preferably arranged removably in vertical direction to the longitudinal axis of the sonotrode. Hereby the anvil and the sonotrode must not be displaced along surfaces coordinated to each other, which would necessitate a special well-matched alignment of the elements to each other. Rather with the apparatus according to the invention the anvil is displaced in direction to the sonotrode essentially centrally to the longitudinal axis of the sonotrode or vice versa.

In another embodiment of the invention the distance between the areas defined by the limitation elements is adjustable depending on the strength of the conductors to be joined or, resp. sealed, where as mentioned above, one cheek only is designed displaceably or, resp. tiltably. The cheeks with anvil and sonotrode define the circularly closed compression chamber of which the front walls are open in order to be able to pass through them the ends of the electric conductors to be joined, preferably strands.

In another embodiment of the invention that must be called special attention to, the longitudinal axis of the compression chamber, which runs parallel to the conductors to be joined, must not absolutely extend parallel to the longitudinal axis of the sonotrode, as it is suggested by the prior art. There is rather a possibility of also arranging the longitudinal axes of the compression chambers due to their simple construction, vertically to the longitudinal axis of the sonotrode. This offers advantages especially for placing or, respectively removing the electric conductors.

Finally the apparatus according to the invention excels by the fact that it is of mobile configuration. Consequently the apparatus can be designed as a hand apparatus which e.g. can be used in the car industry. Thereby the strands coming from a cable board must only be placed in the compression chambers in order to weld them together by excitation of the sonotrode, preferably in the ultrasonic region. Therefore, by such a procedure step, the known crimping operation is not required anymore. By the mobile design of the apparatus, thus the availability of a hand apparatus, there will be the further advantage that several hand apparatuses can be supplied by a sole control or, resp. from a sole generator so that thereby there will be a saving of operational costs. In a mobile design the sonotrode and the booster, which can be configured as a unit grading into each other, can be surrounded in one section by a holding device preferably a hollow cylinder, and fixed by same preferably at two points. From this holding device a handle is then extending by means of which the apparatus is grasped and retained. Then the anvil can be arranged in center above or below the longitudinal axis of the sonotrode and can be displaced parallel to the sonotrode.

Figure 2:
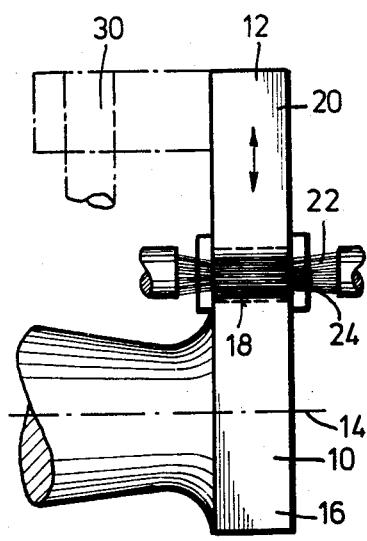
Figure 3:
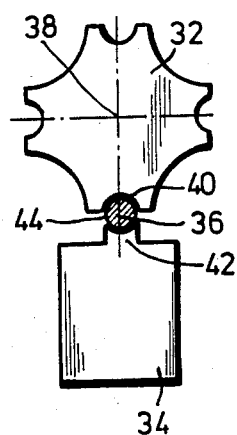
Figure 4:
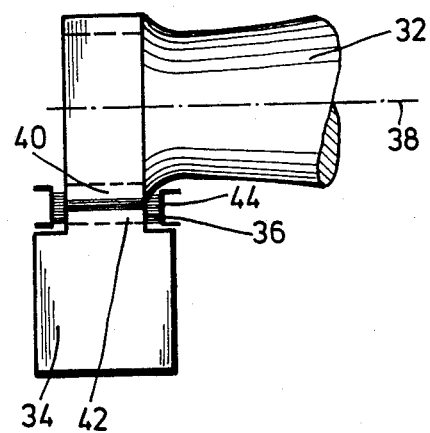
Figure 5:
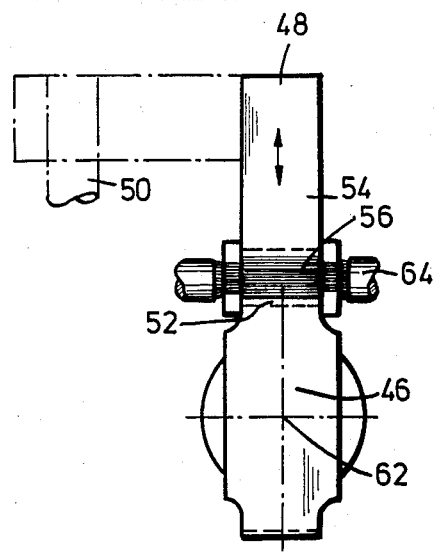
Figure 6:
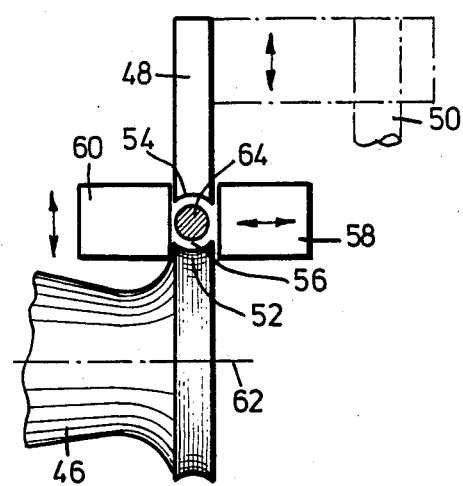
Figure 7:
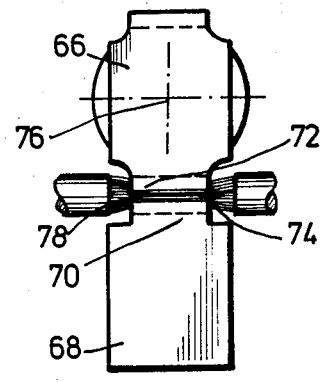
Figure 8:
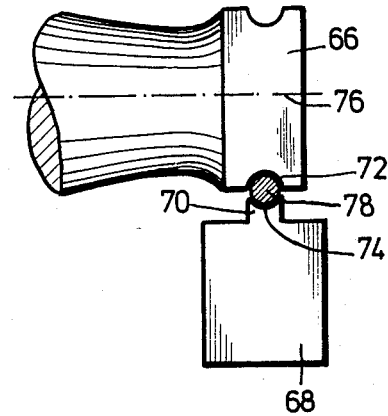

Further details, advantages and characteristics of the invention will follow not only from the claims but also from the preferred embodiment examples resulting from the attached drawing, where FIG. 1 is a front view of a section of the apparatus according to the invention, FIG. 2 is the apparatus according to FIG. 1 in side view, FIG. 3 is a second kind of embodiment of an apparatus according to the invention in sectional and front view, FIG. 4 is the side view of the apparatus according to FIG. 3, FIG. 5 is a third kind of embodiment of an apparatus according to the invention in sectional and front view, FIG. 6 is the side view of the apparatus according to FIG. 5, FIG. 7 is a fourth kind of embodiment of an apparatus according to the invention in front view, and FIG. 8 is the side view of the apparatus according to FIG. 7.

In FIG. 1 a detail is shown of an apparatus according to the invention for joining or, respectively compressing electric conductors like strands, for example. The apparatus comprises a sonotrode 10 of an ultrasonic apparatus being operated in the conventional manner, and as it is also described in principle e.g. in the German application No. 31 51 151. The sonotrode 10 is coordinated with an anvil 12. Thereby the anvil 12 is arranged above the sonotrode 10. The sonotrode 10 itself is preferably of star-shaped design, at least as far as its head 16 is concerned, and in the embodiment example has a total of eight projections, of which one projection for an example has been marked with the reference 18. This projection 18 is coordinated with a projection 20 of the anvil 12. In this embodiment example the projection 18 is arranged centrally above the longitudinal axis 14 of the sonotrode 10, but it can also be arranged out of center. Thereby the projections 18 and 20 are arranged relative to each other in such a manner that they can closely surround the electric conductors 22 to be joined so that with the excited sonotrode 10 a welding or, respectively compressing of the strands 22 can take place. In order to be able to join or, respectively compress conductors of different dimensions by means of one and the same apparatus, the projections of the star sonotrode are of different dimensions. The same applies for the coordinated anvil. In order to prevent the lateral escape of the strands 22 from the compression chamber 24 during this welding operation, in the embodiment example according to FIGS. 1 and 2 the compression chamber 24 is additionally laterally surrounded by fixing or limiting elements 26 and 28, which can also be called cheeks. Consequently the projections 18 and 20 being coordinated with each other as well as the cheeks 26 and 28 are defining the lateral limiting areas for the compression chamber 24, of which the front side openings are provided to put in the strands or, respectively remove them.

Hereby the longitudinal axis of the compression room 24 running parallel to the strands 22 to be welded or, respectively compressed together, is extending parallel to the longitudinal axis 14 of the sonotrode 10. In order that after the welding or compressing operation the electric conductor 22 can be removed without any problems, in a first action the anvil 12 is removed from the sonotrode 10 by lifting. At the same time, e.g. the right cheek or, resp. the right fixing element 28 can be removed (indicated by arrows), in order to enlarge the opening of the compression chamber 24.

In the embodiment example the working travel along a guide 28 for opening or, resp. closing the compression chamber 12 is indicated by arrows in the area of the anvil 12, however, such operation can, of course, also be carried out by the sonotrode 10. Further it must be pointed out that in the case of welded strands 22 their removing from the compression chamber 24 will be facilitated by again putting the sonotrode into oscillation with a second pulse, whereby eventually a sticking to the sonotrode projection 18 will be loosened.

Finally it must be emphasized that the distance between the limiting surfaces of the cheeks 26, 28 is adjustable depending on the strengths of the conductors in order to make available compression chambers of different cross section. Of course, the effective sonotrode and anvil surfaces must then be adapted thereto.

FIGS. 3 and 4 show still another embodiment of an apparatus according to the invention, where a compression chamber 36 is provided by coordinated sections of a sonotrode or, resp. a sonotrode head 32 and an anvil 34, which compression chamber is centrically aligned to the longitudinal axis of the sonotrode 38. In the embodiment example of the FIGS. 3 and 4 there the anvil 34 and thus the compression chamber 36 is arranged below the longitudinal axis of the sonotrode 32. Of course, one can also arrange the compression chamber 36 above the sonotrode. As can be learned especially from FIG. 3, the sonotrode head 32 has recesses on its circumferential surface, of which one thereof for an example has been marked with reference 40. This recess 40 is coordinated with a projection 42 of the anvil 34. Thereby the dimensions of the projection 40 relative to the geometry of the projection 42 of the anvil 34 are chosen in such a manner that the projection 42 at least partially can be placed in the recess 40 of the sonotrode 32. Consequently the projection 42 and the recess 40 alone are defining the compression chamber 36. In order to place electric conductors, as strands or the like, in the compression chamber 36 or, resp. remove them therefrom, the sonotrode 32 or the anvil 34 must exercise a working travel in order to close or, resp. open the compression chamber 36 in such a manner. Likewise the removing after the welding or, resp. compressing operation can be facilitated in such a manner that after opening of the compression chamber 36 the sonotrode is again put into oscillation by a second pulse.

If in FIGS. 1 to 4 the longitudinal axis of the compression chambers 24 or, resp. 36 is arranged parallel to the longitudinal axes 14 or, resp. 38 of the sonotrode 10 or, resp. 32, the embodiments according to FIGS. 5 and 6 provide an alignment turned for about 90°. In other words, the channel-like designed compression chambers are running vertically to the longitudinal axes of the sonotrodes, where however the compression chambers themselves substantially are again arranged centrically above or below the longitudinal axes of the sonotrodes.

In FIG. 5 a sonotrode 46 is coordinated with an anvil 48 exercising a working travel along a guide 50 (of course, the working travel can also be effected by the sonotrode 46). The sonotrode 46 or, resp. the sonotrode head on its circumferential surface is provided with projections, of which one for an example is marked with the reference 52. The projection 52 is coordinated with a projection 54 of the anvil 48. Both projections 52 and 54, of which the surfaces facing each other or of groove-like configuration, are now arranged relative to each other in such a manner that they will define the upper and lower limiting areas of a compression chamber 56. This chamber can be completely closed laterally by limiting elements or, resp. cheeks 58 and 60. Consequently the channel 56 is accessible only through openings of which the connection is running vertically to the longitudinal axis of the sonotrode 62. Through these openings the electric conducturs, like e.g. strands 64 are inserted which are going to be joined.

As soon as the strands are welded to a junction point by ultrasonic oscillations generated by the sonotrode 62, thus the knot of the strand is extending transversely to the sonotrode axis 62, the anvil 68 can be lifted along the guide 50. At the same time the cheeks 58 and 60 can be removed from the compression chamber 56. Thereby the cheek 58 can be pulled away from the compression chamber 56 and the cheek 60 be lifted in direction of the anvil. This is indicated in FIG. 6 by arrows. Vice versa the movement of the individual elements takes place if the compression chamber 56 shall be closed.

Finally FIGS. 7 and 8 show an embodiment corresponding to that one represented in FIGS. 3 and 4, where, however, the compression chamber is likewise extending transversely to the longitudinal axis of the sonotrode. In other words, the sonotrode 66 or, resp. the sonotrode head is coordinated with an anvil 68 having a projection 70, which can be inserted at least in a recess 72 being provided in the sonotrode head 66 in order to define a compression chamber 74. Thereby the longitudinal axis of the compression chamber 74 is arranged vertically to the longitudinal axis 76 of the sonotrode 66. Consequently, according to the embodiment example of FIGS. 7 and 8 it is not necessary anymore to use lateral limiting elements as shown in FIGS. 5 and 6 in order to provide a closed compression chamber 74. For closing or, resp. opening the compression chamber 74, the anvil 68 or the sonotrode 66 must carry out a working stroke. Likewise preferably after having made a joining knot, the joined conductor 78 should receive a second pulse for a renewed excitation of the sonotrode 66 in order to obtain an easy removing of the strand knot.

It should also be pointed out that the surfaces facing each other of the projections or, resp. recesses of the sonotrode and/or the anvil are concavely designed and preferably can be structured in order to give the respective strand joining point an even better tight union.

I claim:

1. A device for the joining of electrical conductors such as strands comprising
   a sonotrode for generating sound vibrations,
   a counter-electrode serving as an anvil for cooperation with said sonotrode, limiting elements, a compression chamber defined between a portion of said sonotrode and anvil and said limiting elements to receive the electrical conductors,
   one of said limiting elements lying opposite and spaced from said other limiting element and said sonotrode and said anvil lying opposite one another and spaced from each other to thereby define said compression chamber, one of said limiting elements and one of said sonotrode and anvil of the compression chamber being movably mounted whereby said device is able to accommodate conductors for varying cross-sections.

2. The apparatus as claimed in claim 1 wherein the sonotrode is provided with means for engaging the electrical conductors and said anvil as means complementary to said means for engaging said respective means of said sonotrode and said anvil together defining the upper and lower limiting areas of said compression chamber.

3. The apparatus as claimed in claim 1 wherein said limiting elements are shaped in the form of cheeks which laterally bound the compression chamber, one of said limiting elements being mounted for movement vertically to the longitudinal axis of said sonotrode.

4. The apparatus as claimed in claim 1 wherein said compression chamber has a longitudinal axis and is channel-like and extends parallel to the conductors to be joined.

5. The apparatus as claimed in claim 1 wherein said sonotrode and said anvil have facing surfaces which are concave.

6. An apparatus according to claim 1, characterized thereby that the distance between the areas defined by the limiting elements can be adjusted according to the thickness of the conductors to be joined.

7. An apparatus according to claim 1, characterized thereby that the apparatus is a mobile construction.

8. An apparatus according to claim 1, characterized thereby that the sonotrode generating the sound vibrations, operating together with a booster to amplify amplitudes, is integrated with the booster to a unit.

* * * * *